July 4, 1944.   V. M. STOWE   2,352,867
PRODUCTION OF AGGREGATES OF ALUMINUM HYDRATE
Filed April 28, 1942
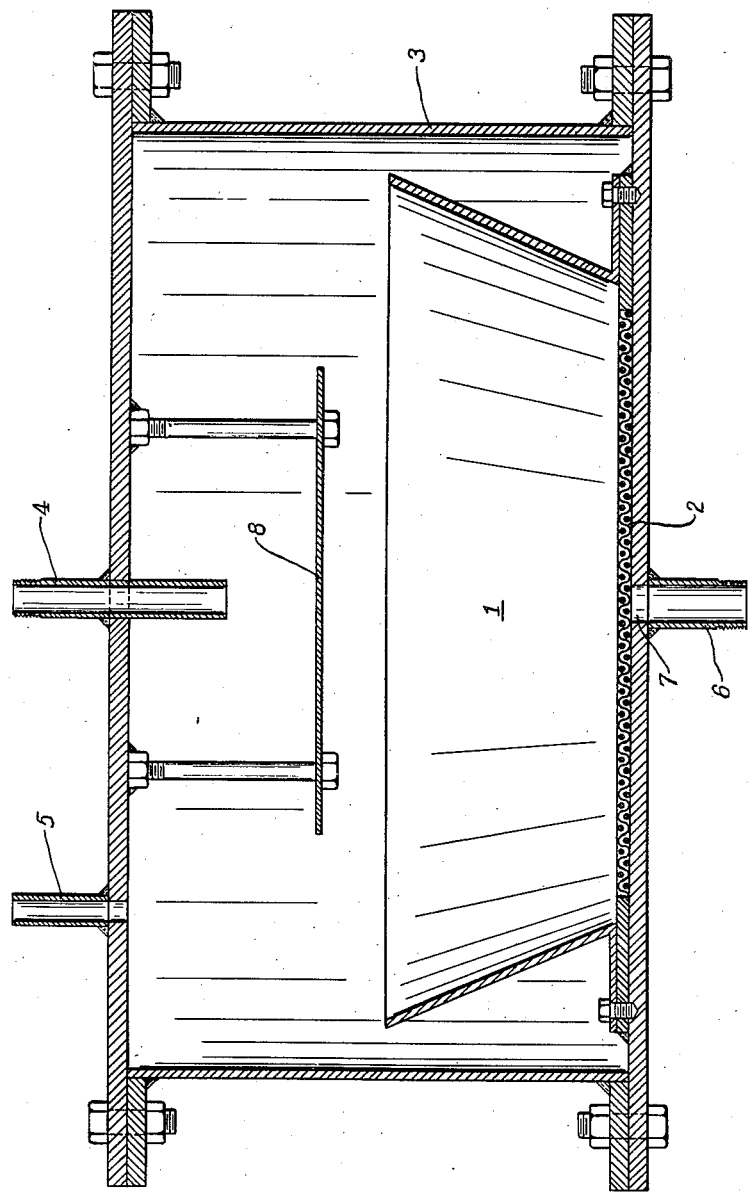
INVENTOR
VERNON M. STOWE
BY
Edward B. Foote
ATTORNEY Patented July 4, 1944

2,352,867

UNITED STATES PATENT OFFICE 2,352,867

PRODUCTION OF AGGREGATES OF ALUMINUM HYDRATE

Vernon M. Stowe, Collinsville, Ill., assignor to Aluminum Company of America, Pittsburgh, Pa., a corporation of Pennsylvania Application April 28, 1942, Serial No. 440,882

14 Claims. (Cl. 18—48)

This invention relates to the production of aggregates of aluminum hydrate, and relates particularly to a process for bonding together particles of aluminum hydrate.

Aluminum hydrate is ordinarily produced commercially in the form of small, individual, crystalline particles. However, it is sometimes desirable to provide relatively large bodies of aluminum hydrate; for example, such bodies may, after proper treatment, be used as adsorbents, as material for use in the manufacture of aluminum salts by reaction with liquids or gases, or as catalysts or catalyst supports in numerous processes. Heretofore, such bodies of aluminum hydrate have been obtained either by cementing together a mass of particles with another material, or by removing from the walls of the precipitation tanks employed in the precipitation of aluminum hydrate from a sodium aluminate solution by the well-known Bayer process the deposit or scale which forms there. The first of these methods has the disadvantage of incorporating foreign material into the mass of aluminum hydrate, which frequently is an undesirable thing to do, and there is also the difficulty that for many purposes where it is desirable to use such aggregates of aluminum hydrate, the cementing materials employed rapidly lose their effectiveness. The second method has the disadvantage that the scale builds up on the walls of the precipitation tanks very slowly, with the result that production of the desired masses of aluminum hydrate is slow.

It is an object of this invention to provide a method for producing aggregates of particles of crystalline aluminum hydrate by bonding a mass of such particles together with additional crystalline aluminum hydrate. It is a further object of this invention to provide a method of bonding a mass of particles of aluminum hydrate together by means of additional aluminum hydrate distributed throughout the mass. It is a further object of this invention to provide a method of strengthening aggregates of aluminum hydrate.

In accordance with this invention, individual particles of crystalline aluminum hydrate are bonded together by passing through a bed of such particles an alkali-metal aluminate solution which is supersaturated with respect to aluminum hydrate, whereupon additional crystals of aluminum hydrate form throughout the mass on the original particles and cement those particles of aluminum hydrate together into a strong, unitary mass. During this operation the particles to be bonded may be supported in a suitable container which permits the solution to flow through the mass without materially agitating the particles, the particles resting on a pervious support having sufficiently fine openings to prevent the particles from passing through the support. For example, cloth, metal screen, or porous paper, such as that known as "building felt," are suitable as the means for supporting the particles. The solution is supplied under sufficient pressure to cause it to flow through the bed readily.

The alkali-metal aluminate solution employed is preferably a sodium aluminate solution. Such solutions may be prepared by various processes, but it is convenient and economical to use the sodium aluminate solution produced in the well-known Bayer process, in which alumina is dissolved from bauxite by heating the bauxite with sodium hydroxide, and the red mud composed of insoluble materials is filtered from the solution produced. A typical sodium aluminate solution produced by the Bayer process contains about 80 g./l. $Al_2O_3$, 98 g./l. NaOH, and 54 g./l. $Na_2CO_3$. The Bayer process solution may vary from the above proportions, but it is necessary that the sodium aluminate solution be supersaturated with respect to aluminum hydrate under the conditions existing when the solution passes through the mass of particles of aluminate hydrate.

In carrying out the process, the aluminum hydrate which cements the individual particles together may be a crystalline form of either aluminum trihydrate or aluminum monohydrate, depending on the particular variety of aluminum hydrate being bonded. The process is operated so that the cementing material is substantially of the same crystalline form as the particles being bonded. When the particles being bonded are aluminum trihydrate of the alpha variety, alkali-metal aluminate solution supersaturated with respect to aluminum hydrate is employed at a temperature at which the solution forms additional crystals of aluminum trihydrate of that variety upon the particles being bonded, a temperature of about 50–100° C. being suitable, and 80–90° C. being preferred. Likewise, when the particles being bonded are aluminum trihydrate of the beta variety, a solution which is supersaturated with respect to aluminum hydrate, and at a temperature at which the solution forms additional crystals of aluminum trihydrate of that variety, is used. Deposition of aluminum trihydrate of the beta variety may be accomplished at a temperature of about 10–50° C., preferably 25–40° C. If aluminum monohydrate particles are being bonded, that form of aluminum hydrate may be formed on the particles with an alkali-metal aluminate solution which is supersaturated with respect to aluminum hydrate, at a temperature above 100° C., and preferably at 130–180° C., though the particular temperature used depends to some extent on the pressure capacity of the equipment in which the process is operated. The varieties of aluminum hydrate mentioned above are described in "The Aluminum Industry," by Edwards, Frary, and Jeffries, vol. I, pp. 166–168 of the first edition.

In general, the crystalline form of aluminum hydrate which forms under the above conditions is the same as that of the particles being bonded; there may also be deposited one or more of the other crystalline forms of aluminum hydrate as a result of the presence of some particles of that particular crystalline form in the mass being bonded, or as a result of some incidental precipitation of particles of that form, which then act as "seed" which causes precipitation of more particles of that same crystalline form. Consequently, the mass of particles being bonded, and the bonded aggregate produced, are not necessarily composed of only aluminum hydrate of one crystalline form.

The length of time during which the alkali-metal aluminate solution is passed through the mass of particles to be bonded depends on such factors as the ultimate strength desired for the unitary mass to be produced, the thickness and permeability of the original body of particles, the amount of pressure applied to the solution to force it through the mass to be bonded, the degree of supersaturation of the solution, and the temperature of the solution, since the speed of deposition of aluminum hydrate varies at different temperatures. Ordinarily from 1 to 25 hours is sufficient time to bond the particles of the original mass into a unitary body, though even longer treatments are sometimes desirable, particularly when large particles are being bonded. Upon completion of the bonding operation it is ordinarily desirable to wash the aggregate with water or other suitable solutions to remove from it any alkali-metal aluminate solution remaining therein, and soluble impurities, such as soda.

It is also possible to employ the process of this invention in producing a bonded body of aluminum hydrate within which there are entrained particles of another material. For example, sawdust may be mixed thoroughly in suitable proportions with the particles of aluminum hydrate (for example, 10 parts of aluminum hydrate to one part of sawdust), and the mixture bonded by passing an alkali-metal aluminate solution through it, as described above, to produce an aggregate containing the sawdust. The sawdust may then be removed from the aggregate—for example, by burning it out—thereby increasing the porosity of the aggregate. Other combustible materials can be used instead of sawdust. Likewise, bonded aggregates containing a catalyst for a particular reaction may be produced by mixing the catalyst, or a substance from which the catalyst can later be produced by reaction, with the particles of aluminum hydrate to be bonded in the manner described previously. Aggregates of aluminum hydrate can be produced, in the manner described above, of any desired shape by merely supporting the mass of particles to be bonded in a container or mold having the desired contour.

It is also possible in many instances to produce bonded aggregates in situ in pipes, tanks or various containers in which the aggregate is intended to be finally used, by supporting a mass of particles of aluminum hydrate therein in the desired location, and bonding the particles together there by the process described. The particles are not only bonded together, but the mass ordinarily remains securely in place, even though the support on which the particles originally rested be removed. As an example of forming bonded aggregates in the object in which they are ultimately to be used, dehydrators for use in refrigerant-carrying lines can be produced by supporting aluminum hydrate in pipe nipples, and cementing the mass in the manner just described, after which the aluminum hydrate can be washed, heated sufficiently to render it adsorbent, and the nipples incorporated in refrigerant lines.

After a mass of particles has been bonded together, it may be subjected to various treatments to render it suitable for the purpose for which it is desired. For example, the mass may be broken up into pieces of any desired size. It may also be partially calcined at temperatures between about 300 and 800° C., to produce a material which is particularly suitable for use as an adsorbent or as a catalyst or catalyst support.

In addition, in accordance with the invention, individual aggregates of aluminum hydrate particles or pieces into which such aggregates have been broken, may likewise be bonded together by flowing an alkali-metal aluminate solution through a bed or mass composed of a number of such aggregates or pieces, the treatment being carried out in the manner described previously for sufficient time to produce on adjacent portions of the aggregates sufficient additional aluminum hydrate of the same crystalline form to unite those surfaces, thus producing a unitary mass which is coarsely porous and particularly suitable for use in conditions where a very rapid flow of liquids or gases through the material is desired. Furthermore, this treatment serves to strengthen individual pieces formed by crushing or breaking aggregates of aluminum hydrate particles.

When aggregates of aluminum hydrate particles are crushed or broken into smaller pieces, the operation often loosens some of the particles of aluminum hydrate at the broken surface, and also produces cracks or incipient cracks in the pieces which weaken them. As a result, difficulties may be encountered because of breaking off of loosened particles and because of insufficient strength in the pieces. However, when an alkali-metal aluminate solution which is supersaturated with respect to aluminum hydrate is allowed to flow over the pieces at the proper temperature, additional aluminum hydrate of the same variety as comprises the pieces is formed on the surface of the pieces and within and over any cracks present, thus cementing loose particles to adjacent particles and, in effect, repairing any cracks present. This phase of the invention may also be employed in strengthening the crushed or broken aggregates without cementing them to each other, by allowing the solution to flow over the aggregates for sufficient time to effect the strengthening of the aggregates without causing appreciable cementing together of the aggregates.

In the accompanying drawing is illustrated apparatus suitable for use in bonding together a mass of particles of aluminum hydrate in the manner described herein. Referring to the drawing, a tray 1, for holding a bed of loose particles of aluminum hydrate and having a pervious base 2 formed by cloth or metal screen of sufficiently fine mesh to prevent the particles of aluminum hydrate to be bonded from passing therethrough under the conditions of operation, is supported in a tank 3. The tank 3 is provided at the top with a lead-in pipe 4 through which alkali-metal aluminate solution can flow into the tank, and with an air vent 5. It is also provided with an outlet pipe 6 located in the base thereof below the pervious base of the tray 1 and registering with the opening 7 through the bottom of the tank, with the result that solution flowing through a mass of particles of aluminum hydrate in the tray passes from the tank through the pipe 6. If desired, channels leading to the opening 7 may be provided in the bottom of the tank, beneath the base 2 of the tray, to facilitate passage of the solution to the opening 7. A baffle plate 8 is suspended from the top of the tank between the pipe 4 and the tray 1 to prevent the solution entering the tank through the pipe 3 from impinging directly on the particles of aluminum hydrate in the tray and disturbing their position.

The following example illustrates the operation of the invention:

A tray similar to that shown in the drawing and six inches deep was almost completely filled with particles of aluminum trihydrate of the alpha variety of 100–300 mesh size, the tray being in a tank similar to that illustrated. Sodium aluminate solution produced by the Bayer process, and containing 80 g./l. $Al_2O_3$, 98 g./l. NaOH, and 54 g./l. $Na_2CO_3$, was pumped into the tank for 10 hours under a pressure of about 40 pounds per square inch, the solution being at a temperature of 80° C. The solution flowed through the aluminum trihydrate in the tray and out of the tank through the outlet pipe. The aluminum trihydrate particles in the tray were cemented into a single, strong block by this treatment, the particles being joined by additional aluminum trihydrate of the alpha variety.

As an example showing the improvement obtained by strengthening broken pieces of aggregates composed of particles of aluminum hydrate in the manner described previously, aggregates of particles of aluminum trihydrate of the alpha variety were crushed into pieces of 2–4 mesh size. One-half thereof was submerged for 19 hours in a flow of the Bayer process solution described in the preceding example, the solution being at a temperature of 70° C. No appreciable cementing together of the aggregates occurred, since with pieces of such size a longer treatment is required to effect cementing. The portion so treated, and the remaining portion, were each washed six times with water at 80° C., and then dried at 95° C. for 16 hours. 120 cc. of each portion were then separately subjected to a pressure of 2000 pounds per square inch in a cylinder having an internal diameter of 1¾ inches, and were then separately shaken on 4-mesh screens for 5 minutes in a standard screen shaker. Of the untreated portion, 34% did not pass through the screen, whereas 49.5 per cent of the treated portion failed to pass through the screen, thus indicating that the treated portion had greater resistance to the crushing operation.

Likewise, when 160 grams each of the treated and untreated aggregates were shaken separately for 30 minutes on a 28-mesh screen in a standard screen shaker, that which had received the strengthening treatment lost only 0.6 per cent in weight as a result of small particles breaking off and passing through the screen, whereas the untreated material lost 21.9 per cent of its weight.

I claim:

1. The process of producing a unitary body of predetermined shape from previously formed particles of crystalline aluminum hydrate comprising forming a plurality of such particles into a mass having the shape of the unitary body to be produced, and subsequently subjecting said mass to a flow of an alkali-metal aluminate solution which is capable of forming on said particles additional crystalline aluminum hydrate, said operation being carried out for sufficient time for the formation of additional crystalline aluminum hydrate uniting adjacent particles.

2. The process of bonding together particles of crystalline aluminum hydrate into the form of a unitary body of predetermined shape comprising forming a plurality of such particles into a mass having the shape of the unitary body to be produced, and subsequently passing through said mass an alkali-metal aluminate solution which is capable of forming on said particles additional crystals of aluminum hydrate of the same crystalline form as said particles, said operation being carried out for sufficient time for the formation of aluminum hydrate of the same crystalline form as said particles and uniting adjacent particles.

3. The process of bonding together particles of crystalline alpha aluminum trihydrate into the form of a unitary body of predetermined shape comprising forming a plurality of such particles into a mass having the shape of the unitary body to be produced, and subsequently passing through said mass an alkali-metal aluminate solution which is capable of forming additional crystals of alpha aluminum trihydrate on said particles, said operation being carried out for sufficient time for the formation of alpha aluminum trihydrate uniting adjacent particles.

4. The process of bonding together particles of crystalline alpha aluminum trihydrate into the form of a unitary body of predetermined shape comprising forming a plurality of such particles into a mass having the shape of the unitary body to be produced, and subsequently passing through said mass an alkali-metal aluminate solution which is capable of forming additional crystals of alpha aluminum trihydrate on said particles, said solution being at a temperature of about 50–100° C. and said operation being carried out for sufficient time for the formation of alpha aluminum trihydrate uniting adjacent particles.

5. The process of bonding together particles of crystalline beta aluminum trihydrate into the form of a unitary body of predetermined shape comprising forming a plurality of such particles into a mass having the shape of the unitary body to be produced, and subsequently passing through said mass an alkali-metal aluminate solution which is capable of forming additional crystals of beta aluminum trihydrate on said particles, said operation being carried out for sufficient time for the formation of beta aluminum trihydrate uniting adjacent particles.

6. The process of bonding together particles of crystalline beta aluminum trihydrate into the form of a unitary body of predetermined shape comprising forming a plurality of such particles into a mass having the shape of the unitary body to be produced, and subsequently passing through said mass an alkali-metal aluminate solution which is capable of forming additional crystals of beta aluminum trihydrate on said particles, said solution being at a temperature of about 10–50° C. and said operation being carried out for sufficient time for the formation of beta aluminum trihydrate uniting adjacent particles.

7. The process of bonding together particles of crystalline aluminum monohydrate into the form of a unitary body of predetermined shape comprising forming a plurality of such particles into a mass having the shape of the unitary body to be produced, and subsequently passing through said mass an alkali-metal aluminate solution which is capable of forming additional crystals of aluminum monohydrate on said particles, said operation being carried out for sufficient time for the formation of aluminum monohydrate uniting adjacent particles.

8. The process of bonding together particles of crystalline aluminum monohydrate into the form of a unitary body of predetermined shape comprising forming a plurality of such particles into a mass having the shape of the unitary body to be produced, and subsequently passing through said mass an alkali-metal aluminate solution which is capable of forming additional crystals of aluminum monohydrate on said particles, said solution being at a temperature of at least 100° C. and said operation being carried out for sufficient time for the formation of aluminum monohydrate uniting adjacent particles.

9. The process of strengthening broken pieces of bonded aggregates of particles of crystalline aluminum hydrate comprising flowing over such pieces an alkali-metal aluminate solution which is capable of forming on said pieces additional crystals of aluminum hydrate, said operation being carried out for sufficient time for the formation of additional crystalline aluminum hydrate uniting adjacent particles of aluminum hydrate of the same piece.

10. The process of strengthening broken pieces of bonded aggregates of particles of crystalline aluminum hydrate comprising flowing over such pieces an alkali-metal aluminate solution which is capable of forming on said pieces additional crystals of aluminum hydrate of the same crystalline form as the aluminum hydrate comprising said pieces, said operation being carried out for sufficient time for the formation of such additional crystals of aluminum hydrate uniting adjacent particles of aluminum hydrate of the same piece.

11. A molded body of aluminum hydrate comprising a plurality of particles of crystalline aluminum hydrate bonded together by additional crystalline aluminum hydrate of the same crystalline form as said particles.

12. A molded body of alpha aluminum trihydrate comprising a plurality of particles of alpha aluminum trihydrate bonded together by additional alpha aluminum trihydrate.

13. A molded body of beta aluminum trihydrate comprising a plurality of particles of beta aluminum trihydrate bonded together by additional beta aluminum trihydrate.

14. A molded body of aluminum monohydrate comprising a plurality of particles of aluminum monohydrate bonded together by additional aluminum monohydrate.

VERNON M. STOWE.